(12) United States Patent
Lipchuk et al.

(10) Patent No.: US 9,384,056 B2
(45) Date of Patent: Jul. 5, 2016

(54) VIRTUAL RESOURCE ALLOCATION AND RESOURCE AND CONSUMPTION MANAGEMENT

(75) Inventors: Maor Lipchuk, Rishon Letzion (IL); Livnat Peer, Raanana (IL); Omer Frenkel, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 186 days.

(21) Appl. No.: 13/610,184

(22) Filed: Sep. 11, 2012

(65) Prior Publication Data

US 2014/0075029 A1     Mar. 13, 2014

(51) Int. Cl.
*G06F 15/173*     (2006.01)
*G06F 9/50*     (2006.01)

(52) U.S. Cl.
CPC .............. *G06F 9/505* (2013.01); *G06F 9/5077* (2013.01); *G06F 2209/5022* (2013.01)

(58) Field of Classification Search
None
See application file for complete search history.

(56) References Cited

U.S. PATENT DOCUMENTS

| | | | |
|---|---|---|---|
| 8,046,378 B1 * | 10/2011 | Zhuge et al. | 707/783 |
| 2007/0266388 A1 * | 11/2007 | Jackson | 718/104 |
| 2009/0282404 A1 * | 11/2009 | Khandekar et al. | 718/1 |
| 2012/0101994 A1 * | 4/2012 | Baffier et al. | 707/640 |
| 2012/0110650 A1 * | 5/2012 | Van Biljon et al. | 726/4 |
| 2013/0014107 A1 * | 1/2013 | Kirchhofer | 718/1 |
| 2013/0073713 A1 * | 3/2013 | Stelmar Netto | 709/224 |
| 2013/0097680 A1 * | 4/2013 | Bendapudi | H04L 67/2842 726/6 |

OTHER PUBLICATIONS

Intel Cloud Builders Guide to Cloud Design and Deployement on Intel Platforms, May 2012, http://www.intelcloudbuilders.com/docs/intel%20Cloud%20Builders_DynamicOps_May2012.pdf.*

\* cited by examiner

*Primary Examiner* — Chris Parry
*Assistant Examiner* — Stephen Houlihan
(74) *Attorney, Agent, or Firm* — Lowenstein Sandler LLP (57) ABSTRACT

Clients access compute resources in a data center organized in logical clusters. A cluster level quota governs access to the compute resources, regardless of the location of the resources which can be part of multiple computers or part of multiple data centers. The cluster level quota can manage allocation and usage of storage, memory, and CPU resources in multi-tenant data center environments. A user requests a computing resource from a logical compute cluster in a data center of host machines hosting virtual machines. According to permissions associated with the user for the logical compute cluster and a cluster quota, the system grants access to the computing resource to the user in response to the request when the cluster quota permits an expected use of the computing resource according to the request.

20 Claims, 11 Drawing Sheets

VIRTUAL RESOURCE ALLOCATION AND RESOURCE AND CONSUMPTION MANAGEMENT

TECHNICAL FIELD

Embodiments of the present invention relate to resource management, and more specifically to applying resource quotas to a cluster layer.

BACKGROUND

Data centers often provide virtualization services for clients. For example, a data center with multiple machines can allocate storage, processors, memory, network bandwidth and other resources to virtual machines operating within the data center. Users of the virtual machines, or the virtual machines themselves, consume resources of the data center. Resource usage is typically limited by available resources. The data center is unable to limit the resources that can be used by a user. While this is not a serious issue in a single-user environment in which a user can consume any available resources without limitation, this arrangement can be especially problematic in multi-user environments. In a multi-user environment, multiple users attempt to use the same data center resources. Thus, two users may attempt to allocate or use the same set of resources. Similarly, the data center is unable to ensure that particular resources will be available for a particular user, because other users may suddenly start using those resources.

BRIEF DESCRIPTION OF THE DRAWINGS

The present invention is illustrated by way of example, and not by way of limitation, in the figures of the accompanying drawings and in which.

DETAILED DESCRIPTION

Described herein is a system, a method and apparatus for implementing and enforcing a quota that provides a virtual logic applicative mechanism for limiting and enforcing user resource usage in a data center at the cluster layer, and not restricted to the physical layer. A cluster layer quota applies to the cluster above the physical layer and above any storage domains. Thus, the cluster layer quota can restrict or constrain resource usage across an entire cluster. A cluster can be a group of computing devices which are connected via one or more networks, and which can cooperate to perform computing tasks. A user can access all or part of a cluster as a single entity without accessing individual computing devices that make up the cluster. Clusters can be administered or controlled via a master computing node, or can include computing devices which are peers without such a master computing node. The cluster layer quota applies to resource usage across multiple devices in a physical or logical cluster of computing devices for a particular compute job, user, user group, or other entity. For example, a physical layer quota can restrict resource usage on a single physical machine, such as restricting a virtual machine to 2 gigabytes of memory on the physical machine. A cluster layer quota can restrict or constrain resource usage on multiple physical machines in the cluster or data center, such as restricting a user of the data center to a total of 64 gigabytes of memory in aggregated use across all physical machines. The resource usage in the cluster layer quota can be applied to multiple different projects, such as multiple virtual machines, running under the control or direction of a single entity, such as a user, or multiple entities, such as a group of users participating in a shared computing project. Other entities include automated processes which may invoke sub-processes to be run on the cluster, subject to a cluster layer quota. For example, with a cluster layer quota of 64 gigabytes of memory, the user can operate a first virtual machine using 32 gigabytes of memory on a first machine in the data center, a second virtual machine using 16 gigabytes of memory on a second machine in the data center, and third and fourth virtual machines each using 8 gigabytes of memory on a same third machine in the data center. Cluster layer quotas can be applied in addition to physical layer quotas, to enforce overall usage of the data center in addition to restricting usage of resources on specific machines.

The quota can be configured by defining a set of rules. The quantity and type of rules for a particular quota can vary for different quotas. For example, rules defining the scope of a storage quota can be defined in terms of gigabytes, while rules defining the scope of a cluster quota can define an amount of virtual memory and a number of virtual CPUs or CPU cores. Quota limitations and rules can be defined globally for the entire data center or locally for each storage domain of a specific cluster, or specifically for one scope and globally for another. A storage domain is a set of storage devices available to a specific cluster. The storage domain can include local disks of various computing devices, as well as a dedicated storage device, such as a network attached storage (NAS) device. A cluster can use one or more storage domains, but may use a portion of a storage domain at any given time.

Figure 1:
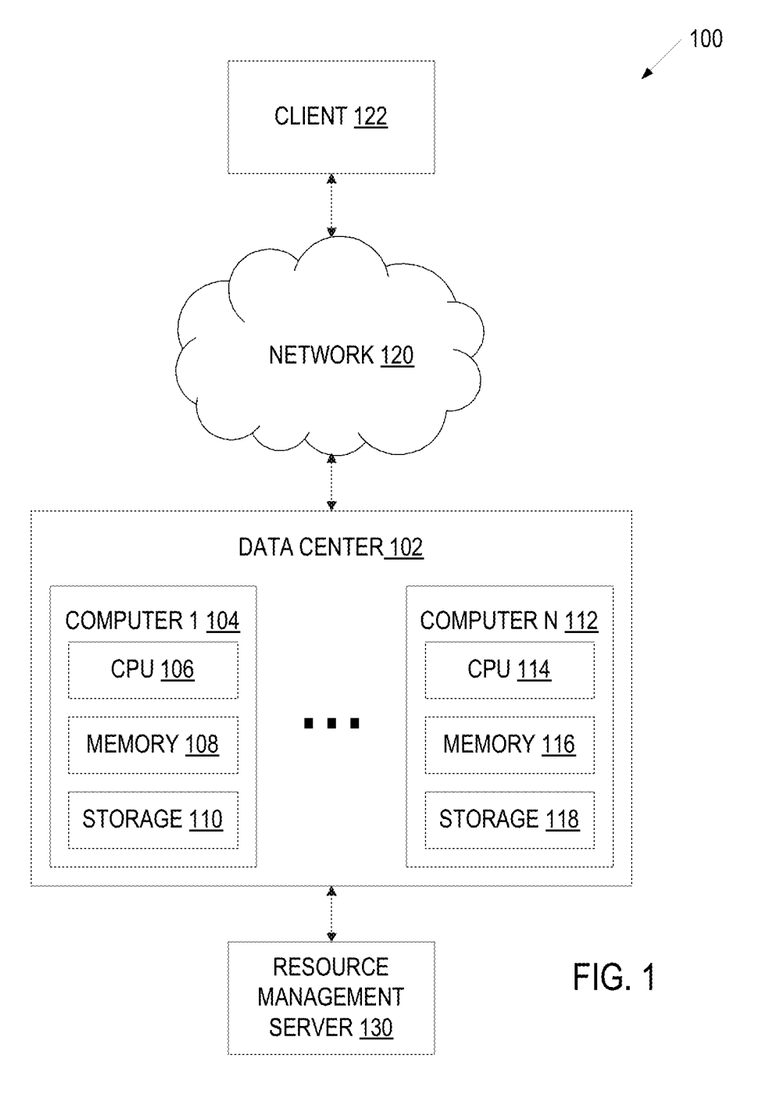
FIG. 1 illustrates a block diagram of an example architecture for a data center.

FIG. 1 illustrates a block diagram of an example architecture 100 for a data center 102. A client 122 communicates with a data center 102 via a network 120. The data center includes multiple computing devices 104, 112, each having their own internal computing resources such as CPU 106, 114, memory 108, 116, and storage 110, 118. The client 122 can request use of compute resources in the data center 102. The data center 102 includes a resource management server 130 that manages and assigns compute resources to clients 122 based on a cluster layer quota and in accordance with embodiments of the present disclosure, as will be discussed in more detail below.

Figure 2:
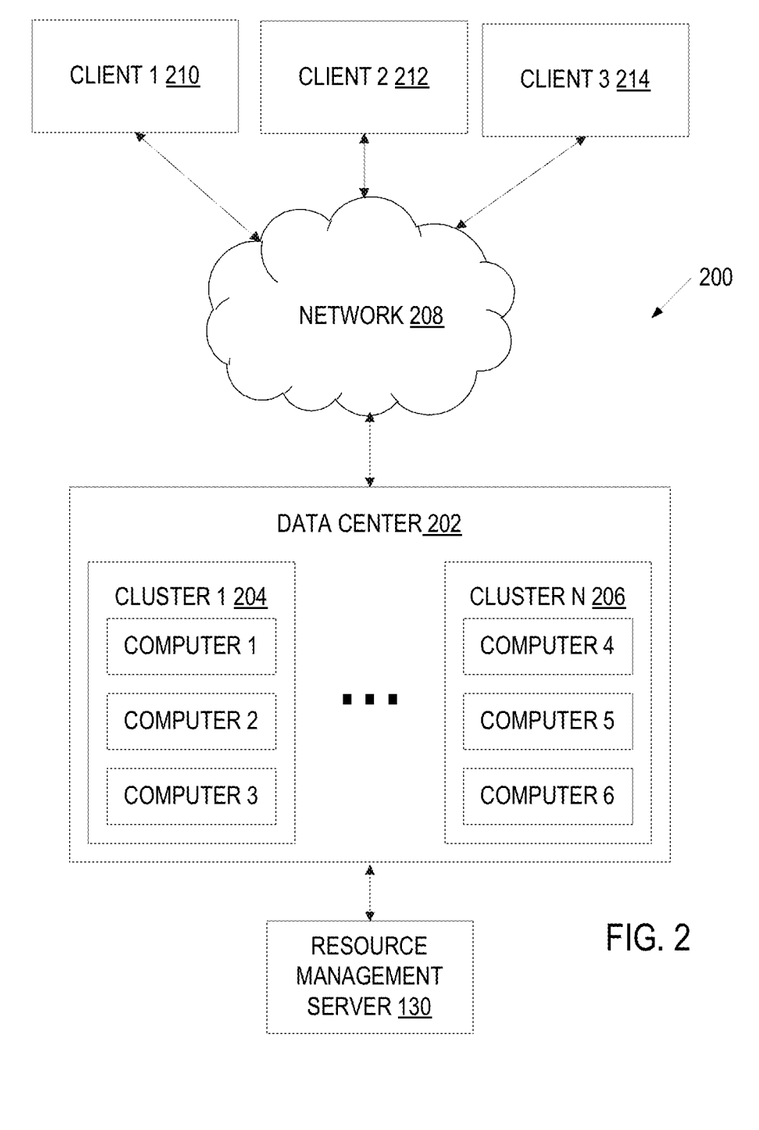
FIG. 2 illustrates a block diagram of an example architecture for logical clusters in a data center.

FIG. 2 illustrates a block diagram 200 of an example architecture for logical clusters 204, 206 in a data center 202. Clusters, or logical groupings of resources, allow resource management server 130 of the data center 202 to provide a somewhat higher level abstraction and division of compute resources within the data center 202. Clusters can be logically grouped even though the resources may be in different data centers, different locations, of different device types, of different resource types, and so forth. Each cluster 204, 206 can include or be assigned multiple computers or other resources, such as storage or network bandwidth. Then, clients 210, 212, 214 can access clusters 204, 206 to consume resources within the clusters 204, 206. In one embodiment, multiple users can access the same cluster. Clusters 204, 206 can overlap on the same physical machine, so that one machine is part of multiple clusters. The resource management server 130 of the data center 202 can enforce cluster level quotas for usage of clusters or logical groupings of resources. Cluster level quotas can be enforced in addition to or as a replacement for local machine quotas.

Figure 3:
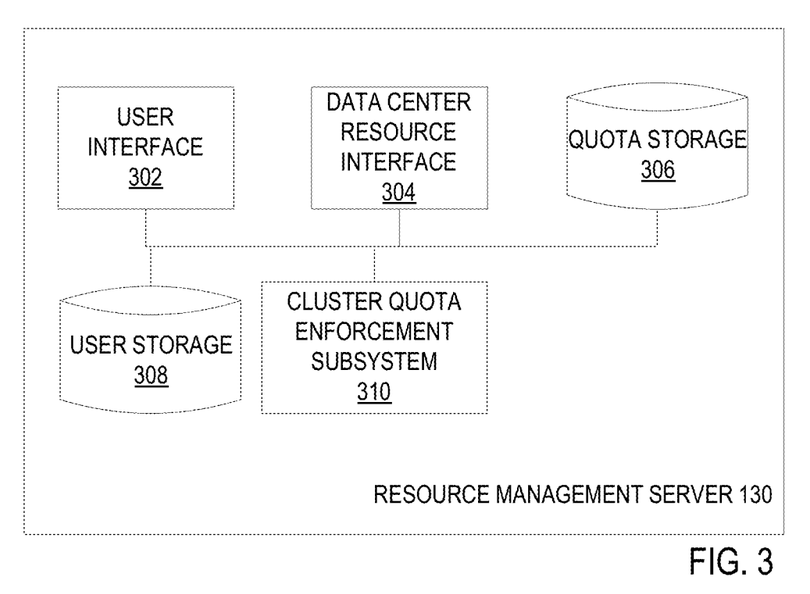
FIG. 3 illustrates a block diagram of components for enforcing cluster quotas in a data center.

FIG. 3 illustrates a block diagram of components for enforcing cluster quotas in a data center 202. The resource management server 130 of the data center 202 can include a user interface 302 for interacting with the user, such as via a graphical user display, text input, remote access, access and control via an application programming interface, and so forth. The resource management server 130 can include a data center resource interface 304, through which the data center controls the usage, consumption, logical grouping, and access to resources in the data center. The resource management server 130 can also include a quota storage 306 which stores the various active and inactive quotas which apply to clusters and resources under management by the resource management server 130. The quota storage 306 can also store log files or other historical data about resource usage under specific quotas. A user storage 308 contains a list of users who are authorized to access the resources under the quotas, and can further store user credentials, a list of which quotas a user is authorized to access, and specific permissions for those quotas. The cluster quota enforcement subsystem 310 can intercept various transactions or other events for accessing, allocating, freeing, or otherwise using resources managed by the resource management server 130 via a quota. For example, when the cluster layer quota is applied to a storage resource, the cluster quota enforcement subsystem 310 can intercept all requests for allocating or freeing storage, but would not necessarily need to intercept requests to write to or read from allocated storage. Similarly, when the cluster layer quota is applied to a network bandwidth resource, the cluster quota enforcement subsystem 310 can intercept all requests to transmit data on the network, requests to initialize network adapters, incoming network packets, and so forth. The quota enforcement subsystem 310 can intercept different types of requests for concurrently enforced cluster layer quotas for different resources. At each event, the cluster quota enforcement subsystem 310 can determine whether the action should be constrained by an active quota. If so, the cluster quota enforcement subsystem 310 allows the action under the quota and any applicable grace limit. If the action is allowed, then the cluster quota enforcement subsystem 310 permits the action to proceed. However, if the action is not allowed or would exceed the quota and any applicable grace limit, then the cluster quota enforcement subsystem 310 can prohibit the action from proceeding and write an error in a log file, can prompt the user to provide additional credentials via the user interface 302, or take other appropriate action. Based on a user's permissions, the cluster quota enforcement subsystem 310 can simply allow the action regardless of the quota. If the action is not constrained by an active quota, then the cluster quota enforcement subsystem 310 can either allow the action to proceed, or can refrain from monitoring events associated with that action. In a specific example embodiment, the action is creating a new virtual disk for a user as part of a cluster. A virtual disk can be a disk image which is used by a virtual machine, for example, to simulate an actual storage device via a file stored on an actual storage device. A virtual machine accesses the virtual disk and can read and write on the virtual disk as if the virtual disk were a physical storage device. The cluster quota enforcement subsystem 310 intercepts the request to create the new virtual disk, and checks with the quota storage 306 and user storage 308 to determine if the user is subject to a quota for creating new virtual disks, and if the request to create the new virtual disk in the cluster is allowed, the cluster quota enforcement subsystem 310 further checks with the data center resources, via the data center resource interface 304, whether sufficient resources are available in the cluster to service the request to create the new virtual disk. If so, the resource management server 130 creates the virtual disk for the user.

The resource management server 130 can be configured to handle quotas differently. For example, the resource management server 130 can be configured to enforce quota restrictions, to use a permissive mode for generating usage audit logs, to avoid using quotas at all or to disable quotas, or to use a permissive mode. In an embodiment, a quote can be verified in a disable mode, an enforce mode or a permissive mode. In disable mode, no conditions are checked. In enforce mode, the user is blocked when operations exceeds the designated limitations. In audit (or permissive) mode, audit logs are provided along with warnings when limitations are to be exceeded, but the user is not blocked from performed the desired operation.

In an embodiment, quotas can include a threshold limit or a grace limit which can be measured in a percentage threshold limit or an absolute threshold. In one embodiment of a percentage threshold, the data center can allow a quota grace limit for a user so that resources consumed by the user can exceed the quota by 5%. In an embodiment of an absolute threshold, the data center can allow a quota grace limit for a user so that storage resources consumed by the user can exceed the quota by 2 gigabytes. The data center can display or otherwise provide to the user a message when the grace limit is being applied, or when the grace limit is exceeded.

The data center 202 can include a quota manager, which may be incorporated as part of the cluster quota enforcement subsystem 310, that checks and enforces quota compliance, such as when specific events occur. For example, the quota manager can validate a storage quota when adding a new disk to a virtual machine or launching a virtual machine that uses a currently unused disk. Similarly, the quota manager can validate a cluster quota when launching a new virtual machine or cloning a running virtual machine. These quota compliance events can be based on specific user actions, or based on specific data center actions. In one example, a user request for a new virtual machine can include an instruction to invoke the quota manager to review and validate the user request prior to its execution. In another example, the quota manager is linked to data center command to load a new virtual machine, so that attempts to execute the command to load a new virtual machine are intercepted and the quota manager can validate the quota prior to executing the command. In an alternate embodiment, the quota manager monitors the data center environment at some interval or continuously to check and enforce quota compliance.

The validation of storage quotas may be synchronized with parallel operations requesting to consume storage space under the quota. For example, the data center can maintain a cache in memory that maps commands to quota resources to be used when the command is executed and deletes commands from the map after the command is executed and the quota resources are allocated or in use. Validation for quota space can also incorporate data describing existing images of virtual machines or running virtual machines as well as the map of ongoing commands which the quota is processing for approval or which may still request the use of additional resources.

Quotas can provide a logic mechanism for a data center administrator to manage resource allocation for users and groups in the data center. A quota management console can allow the administrator to manage, share and monitor the resources in the data center from the engine core point of view, as well as add, remove, enable, disable or modify quotas, monitor grace limits, add or remove users from quotas, and so forth.

A quota can be a separate, searchable object in the data center. In one embodiment, a quota can include a name, description, data center to which the quota applies, a list of any number of rules specifying a resource and resource limitation parameters, a list of users or groups that have permission to use the quota, and allowed actions for the list of users or groups.

The example quota below is provided as one embodiment of a quota for a research and development team.
Name: DevelQuota
Description: Quota configured for R&D team
Data Center: Devel Data Center
Resource limitations:
Virtual CPU (VCPU)/Memory limitations:
Cluster1: 6 VCPUs, 9 GB RAM
Cluster2: 8 VCPUs, 12 GB RAM
Storage Limitations:
Storage Domain1: 20 GB
Storage Domain1: 10 GB
Storage Domain3: 50 GB
List of Users/Groups:
developers
team_leaders
new_developer The limitation on a resource can be specified either on a specific resource or globally. The example above illustrates a limitation on a specific resource, such as restricting the Storage Domain1 to 20 GB, or restricting Cluster1 to 6 virtual CPUs and 9 GB of RAM. In an example of a global resource limitation, the example research and development quota can indicate, for example, that the storage limitation is a total of 80 GB, regardless of which storage domain(s) the storage space is used. However, the global storage limitation can provide further storage domain specific details, such as indicating a global storage limitation totaling 40 GB, with no more than 20 GB on any single storage domain. The global resource can define limitations on the data center for a specific type of resource, such as storage or CPU time. Some additional examples of global limitations on the Cluster and the Storage are provided below:
Global Cluster: 14 VCPUs, 21 GB RAM
Global Storage: 80 GB A quota limitation can be also set to unlimited, both globally, or on a specific resource. Portions of a quota which are unlimited can be determined based on an explicit entry in the quota or based on an absence of any specific restriction on the resource. A set of example unlimited quota limitations are provided below, where the global quota is unlimited, but the quota on storage domain2 is limited within the global quota:
Global Cluster: Unlimited
Storage Domain1: Unlimited
Storage Domain2: 50 GB
Storage Domain3: Unlimited The quota object can be in the data center scope. Further, a data center can be related to at least one quota object. Each data center entity can be configured with one of the following operation modes: disable, soft limit, or hard limit. In the disable operation mode, the data center either does not apply to implement quota restrictions, ignores quota restrictions, or is otherwise not subject to quota restrictions. In the soft limit operation mode, the data center issues warning messages when quota restrictions are exceeded or about to be exceeded. In the hard limit operation mode, the data center can enforce the quota restrictions completely and prevent requests for resource allocation or other resource usage which would exceed the quota restrictions. In one embodiment, the data center operates in different modes for different users. For example, the data center can apply the soft limit operation mode to a first user or user group, while simultaneously applying the hard limit operation mode to a second user or user group. The user who created the quota object may or may not have permissions to consume resources under the quota object.

In one embodiment, a quota object can be deleted, removed or otherwise disabled only when no entities, such as a virtual machine or a template, are referencing the quota object. The data center can either wait to delete the quota object until the entities are done using resources under the quota object, or the data center can force a release of the entities' use of the resources prior to deleting the quota object. Quota objects can be edited. When a quota object is edited, the data center can apply any changes to all entities that are assigned to the quota, but only for future allocations of resources. However, a change in the parameters of a quota object can result in an entity's use exceeding the new resource limitations. For example, the quota object may be edited to reduce the disk limitation of some storage domain, reduce CPU/RAM limitations, or remove a user from the list of users permitted to use the quota. When a quota object is edited to reduce the available resources or the number of permitted users, the existing use of the data center continues, in excess of the edited quota object, but users will not be able to exceed the quota object limitations again after the resources are released. In one variation, an administrator or other user can indicate which currently used resources under the quota object should be forcibly released to conform to the reduced quota limits. Similarly, if a user is removed from the list of permitted users for a quota object, the data center will not take an immediate interruptive action against the removed user. However, that user will be unable to use this quota again, unless permission is re-granted.

The data center can provide a wizard or other graphical user interface for an administrator to manage quota objects. For example, the administrator can create or edit a quota via the wizard. The wizard can allow administrators to configure cluster quota parameters, storage quota parameters, and assign users, groups of users, or other entities which are authorized to consume the resources under the quota. Quotas can be cloned, so that an administrator can quickly duplicate the settings of a quota for one user and apply those settings to a separate quota for a different user. In one implementation, the cloning operation copies all the quota properties except for the name and the description. The administrator can specify exactly which properties are copied from a source quota to a cloned quota.

In one embodiment, the data center assigns users associated with the quota power user permission on the consumable resources. For example, when users add or edit a virtual machine, the data center can grant users the applicable permissions for that virtual machine. The data center can, through the wizard interface, automatically add or create these permissions. However, in one embodiment, the data center does not remove permissions when removing resources from the quota, but can present an alert message. The alert message can state "Attention, quota $ {QuotaName} resources have been changed. If needed, update relevant permissions accordingly."

The data center can provide an aggregated view of defined quotas versus actual storage space used/free. FIGS. 4-12 illustrate various example embodiments of user interfaces. The example user interfaces can be part of an administrator portal or user portal. An administrator portal or interface can allow an administrator to view, edit, or create quotas, and to view quotas by resource, such as by user, cluster, or storage domain. A user portal can allow a user to view quotas defined or used by him or her self, and consume quotas based on resource usage, such as CPU usage and storage usage. In one embodiment, a single portal or interface can provide administrator functionality for some quotas and user functionality for other quotas for a same user.

Figure 4:
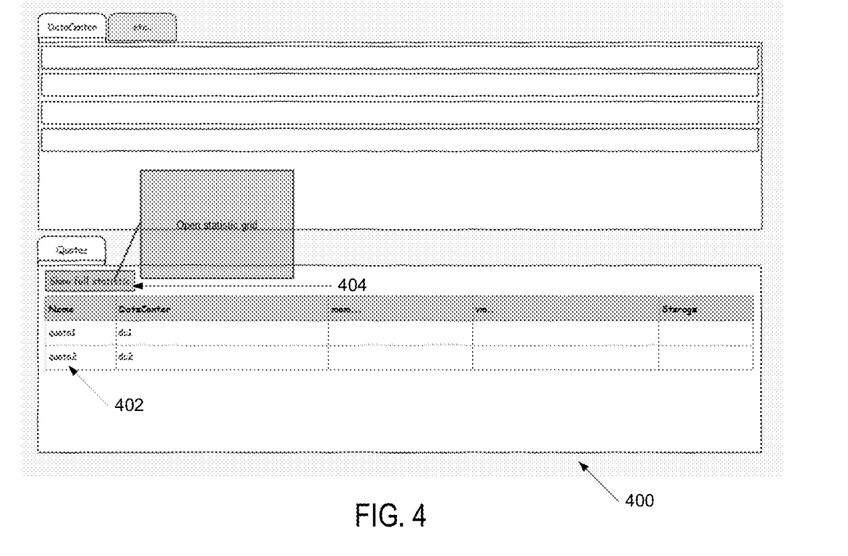
FIG. 4 illustrates an example user interface for opening a statistical grid in a wizard.
Figure 5:
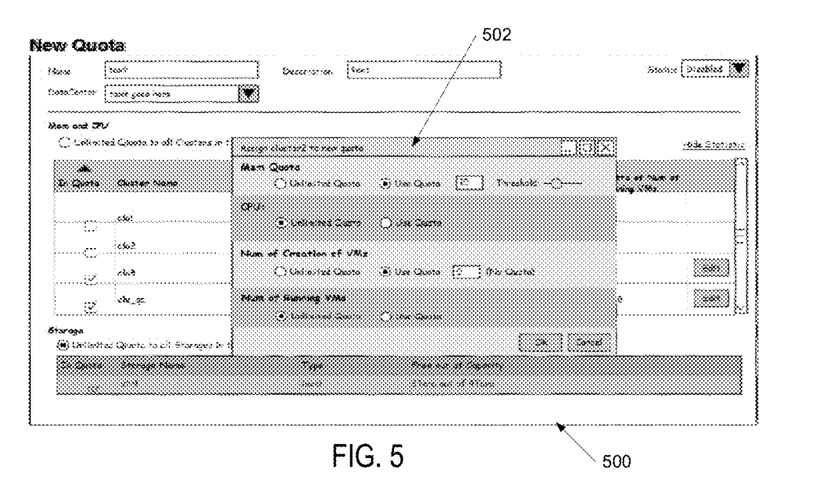
FIG. 5 illustrates a first example user interface for creating a new quota in a wizard.

FIG. 4 illustrates an example user interface for 400 opening a statistical grid in a wizard. The user interface 400 shows two existing quotas 402, quota1 and quota2. The user can click a button 404 to display additional statistics or other details associated with a particular quota. In this case, quota1 is associated with data center dc1, and quota2 is associated with a different data center, dc2. FIG. 5 illustrates a first example user interface 500 for creating a new quota in a wizard. The interface can present a pop-up 502 over the existing user interface, prompting the user to set specific aspects of the quota to create and which cluster to assign to the quota. In this case, the user is assigning cluster2 to a new quota. For example, the user can indicate a memory quota, CPU quota, a maximum number of virtual machines, a maximum number of concurrently running virtual machines, which users are associated with the quota, and so forth. In an embodiment, the pop-up 502 may be populated with default values. For example, the default values can be populated based on a user type, based on a type of action the user is performing, or based on the settings used to create a preceding quota. The system can populate a list of users associated with the quota based on user input, or based on users that are under management of the user creating the quota or peers of the user creating the quota, for example.

Figure 6:
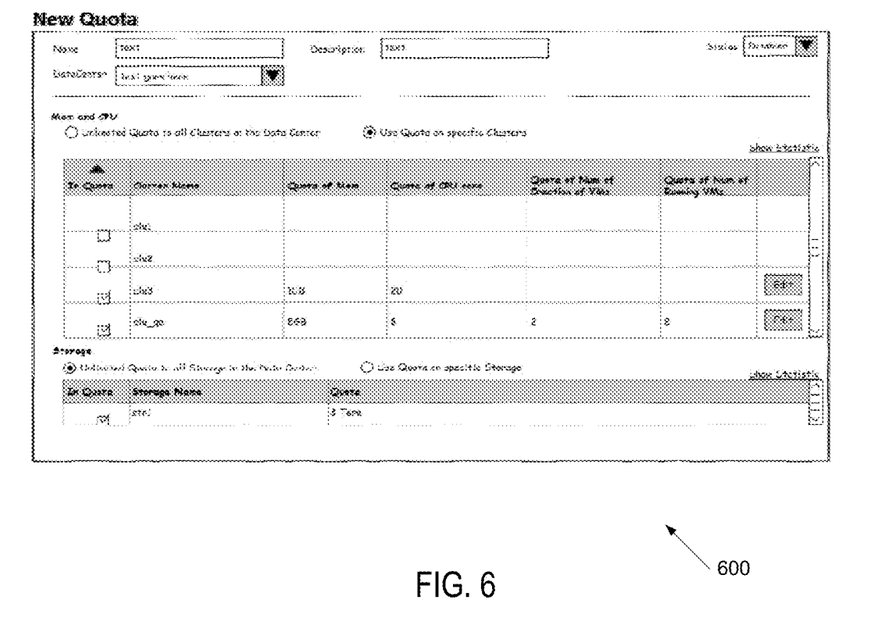
FIG. 6 illustrates a second example user interface for creating a new quota in a wizard.
Figure 7:
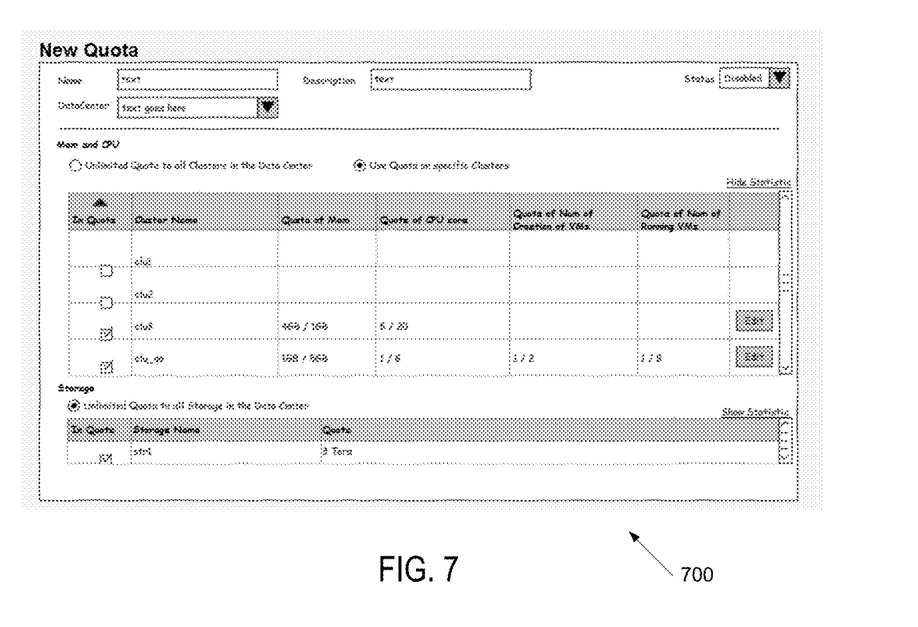
FIG. 7 illustrates a third example user interface in a wizard for creating a new quota for specific clusters.
Figure 8:
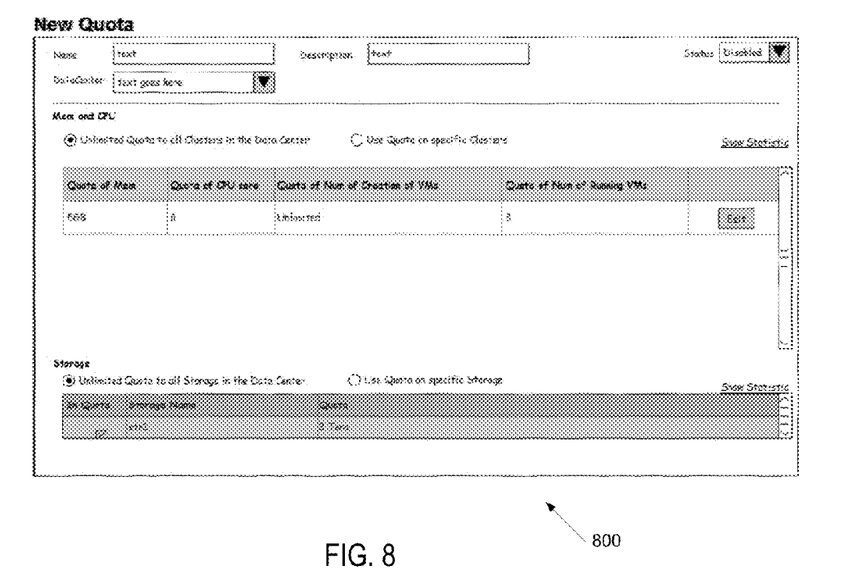
FIG. 8 illustrates a fourth example user interface in a wizard for creating a new quota with an unlimited quota to all clusters.

FIGS. 6 and 7 illustrates additional example user interfaces 600, 700 for creating a new quota in a wizard and for creating a new quota for specific clusters. FIG. 8 illustrates a fourth example user interface 800 in a wizard for creating a new quota with an unlimited quota to all clusters. This user interface 800 illustrates how a user or administrator can filter the list of displayed quotas to show only those quotas which are not limited to a specific cluster in the data center. In this case, the single quota displayed has a memory quota of 5 GB, a CPU core quota of 8, a virtual machine creation quota that is unlimited, and a simultaneously running virtual machine quota of 8. However, the quotas are applied for a particular user or group of users across any number of clusters. If the same quota were restricted to a specific number of clusters, then the user would be able to spread the usage of resources indicated in the quota across no more than the indicated number of clusters.

Figure 9:
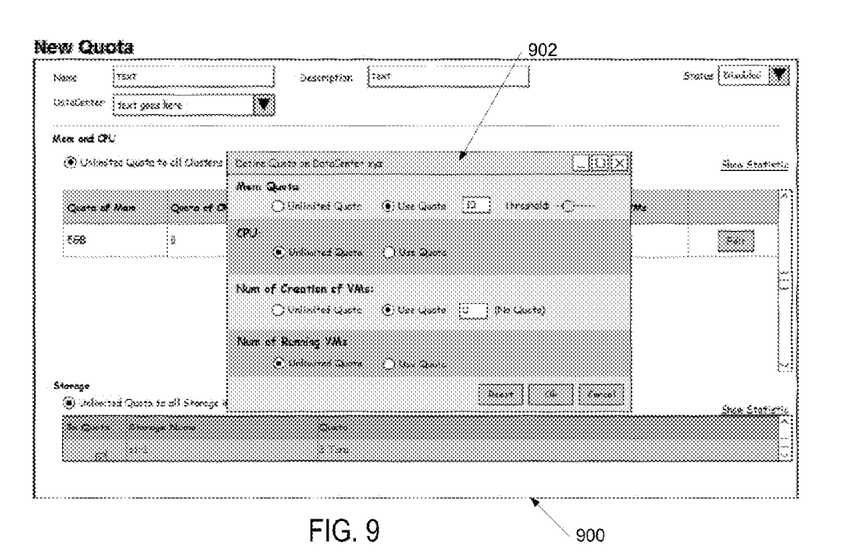
FIG. 9 illustrates a fifth example user interface in a wizard for providing details for an unlimited quota.

FIG. 9 illustrates a fifth example user interface 900 in a wizard for providing details for an unlimited quota. The user interface 900 can include a pop-up 902 for defining a quota for a particular data center. In this case, the user is defining a quota for data center xyz. The user can indicate a memory quota via radio buttons and a text box and can indicate a threshold via a slider. The user can indicate a CPU quota, a maximum number of virtual machines, a maximum number of concurrently running virtual machines, which users are associated with the quota, and so forth. In an embodiment, the pop-up 902 can include default values populated based on a user type, based on a type of action the user is performing, or based on the settings used to create a preceding quota. The system can populate a list of users associated with the quota based on user input, or based on users that are under management of the user creating the quota or peers of the user creating the quota, for example.

Figure 10:
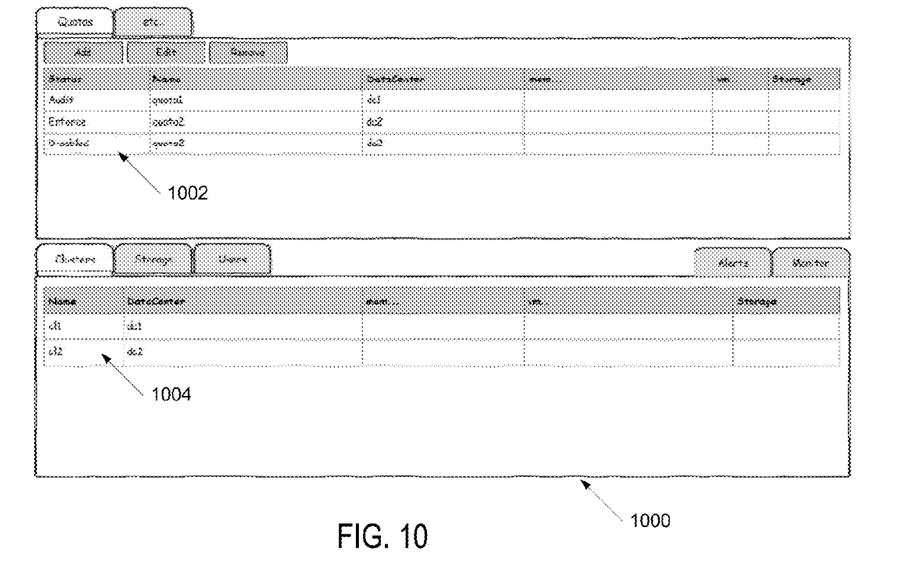
FIG. 10 illustrates a sixth example user interface in a wizard showing established quotas.

FIG. 10 illustrates a sixth example user interface 1000 in a wizard showing established quotas. The user interface 1000 shows a list 1002 of established quotas. Quota1 has a status of "audit." The data center can audit usage of resources under Quota1 and enforce the quota. Quota2 has a status of "enforce." The data center can enforce the quota without auditing usage. Quota3 has a status of "disabled," which means that the data center does not enforce this quota, but can still track resource usage under this quota if the user so desires.

Figure 11:
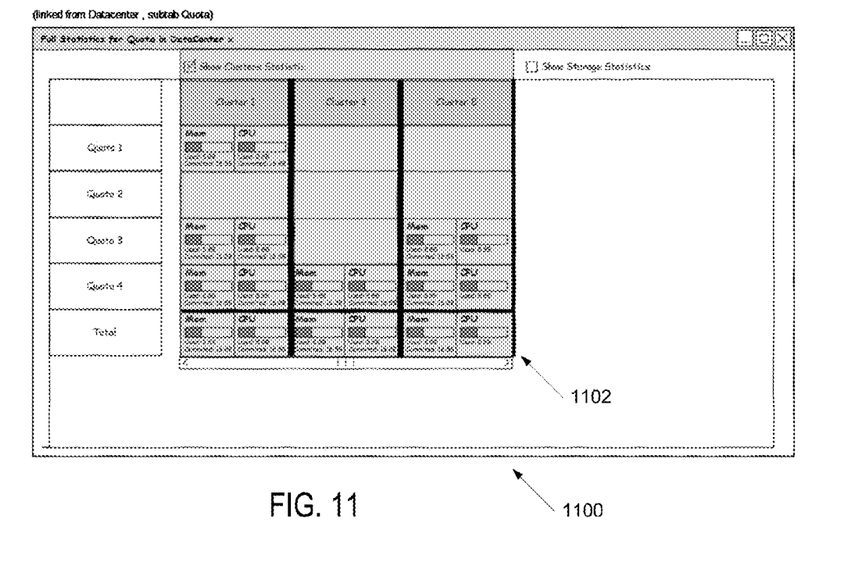
FIG. 11 illustrates an example table showing quota usage across multiple clusters.

FIG. 11 illustrates an example user interface 110 with a table 1102 showing quota usages across multiple clusters. The table 1102 shows four quotas and three clusters, and usage of memory and CPU resources under the quotas in each cluster. Empty spots in the table 1120 indicate that resources for a particular quota and cluster combination are not allocated or used. Certain slots indicate how much of a resource is used and how much of the resource is committed to the quota, while other slots only indicate how much of the resource is used, meaning that the quota for resource usage on that particular slot is either unlimited, disabled, or not enforced. The table 1102 can provide an overview of where resources are being used, and how close each resource is to its quota. While this type of report is presented graphically in a table 1102, the data center can provide all or part of this type of information in a text or other type of environment.

Figure 12:
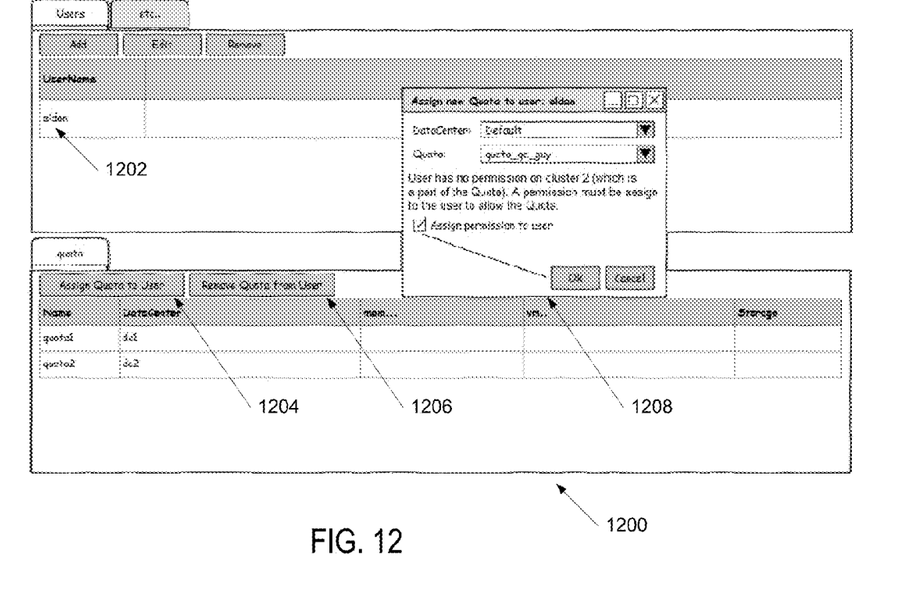
FIG. 12 illustrates an example user interface for assigning a user to a new quota.

FIG. 12 illustrates an example user interface 1200 for assigning a user to a new quota. First, an administrator or other authorized user selects the user 1202 to assign to the new quota. Then the administrator can click the button 1204 to assign the quota to the user 1202. The user interface displays a pop-up 1208 in which the administrator selects the data center and specific quota to which to assign the user 1202. In an embodiment, the user interface can populate the pop-up with default or expected values, and can provide any additional available information about the user, quota, data center, or cluster. After the user is assigned to the new quota, the user interface 1200 can display or enable the remove quota button 1206, which the administrator can use to remove the quota. The system can enforce any applicable specific resource quotas to the user's actions starting as soon as the quota is assigned. In one embodiment, the system does not count resources in use when the user is assigned to the quota as part of the quota.

In an embodiment, for a new or upgraded data center, the default operation mode can be 'disabled', which means the data center is not subject to any quota restrictions, ignores quota restrictions, or does not apply quota restrictions. Alternatively, the data center can implicitly create an unlimited quota object and attach all objects, clusters, users, or other entities to the unlimited quota object. The data center can allow all users to access and consume resources under the unlimited quota object. Then, when an administrator or other user chooses to enable the quota mechanism, he or she can remove permissions to the unlimited quota, or can disable or remove the unlimited quota. In an embodiment, when a data center is updated, the system can create an automatic default quota for the data center with permissions for everyone, and unlimited space for storage and cluster use. In an embodiment, when the data center operates in disabled mode, the default quota may be the one that all the resources are consumed from, and when the data center becomes active, this default quota may behave as a regular quota.

In one embodiment, users can edit the default quota only when the data center quota mode is not disabled. When a user edits the default quota, the quota will lose its default flag, and the system can prompt the user to change the quota name prefix, for example. When the user changes the data center quota mode back to disabled, the data center can check whether the default quota was changed or not. In this example, if the default quota was not changed, then the default quota stays the same and permission for Everyone will be added to it. If no default quota was found, which means that the default quota was changed when the data center was not disabled, then the data center can create a new default quota with a default name or some other name.

The data center can enforce quotas at various times. In one embodiment, the data center enforces quotas as runtime limitations enforced during execution of a virtual machine. Specific quotas or specific portions of quotas can be enforced at specific event types related to or based on the type of the specific quota. For example, the data center can enforce a quota storage limitation upon any requirement or request to allocate storage, such as a request to store a file or open a virtual disk image. Certain types of virtual machine storage, such as Quick EMUlator (QEMU) Copy on Write (QCOW), delay allocation of storage until storage is actually needed. In other words, QCOW virtual disks are not pre-allocated, like templates or a stateless virtual machine. When the data center handles QCOW write requests, the data center can ensure that the quota consumes the total maximum size of the disk, since that is the maximum potential size that can be used by a QCOW write request. In another variation, the system can attempt to determine an expected write size or an average write size and ensure that the quota can handle that expected or average size, or the expected or average size plus an additional amount of storage. Then, if the actual amount of storage exceeds the expected or average size and the additional amount of storage, the data center can provide a message to the user either notifying the user that the storage transaction failed or prompting the user to provide the additional storage. Then the user can either free up other storage resources under the storage quota, or expand the storage quota. Similar principles can be applied to network usage quotas, by allocating a set amount of transmission throughput for a network request in advance of completing the network request, or by allocating a recurring or periodic expected amount of network transmission throughput for a particular network activity.

The data center can configure alerts for quotas when a quota is about to be full or exceeded. Both users and administrators can configure alerts, as well as thresholds that can trigger the alerts. The data center can implement default alerts and thresholds for the alerts. In one embodiment, the default threshold for administrators is 60% of the quota, and for regular users is 75% of the quota. So, if the administrator is using more than 60% of the storage quota, then the system can send an alert to the administrator or to some other user. Alerts can be graphical, auditory, or provide some other indication to the user. Alerts can include pop-up messages in a GUI, an entry in a log file, an email or text message, and so forth. The system can send alerts periodically as long as the threshold is exceeded, once when the threshold is exceeded, or at specific events that cause increase usage of resources under the quota beyond the threshold.

The data center can maintain a history of quota utilization, which can include log entries. Then, a user can browse and view historic quota utilization to determine if a particular quota is too high or too low, or to identify problem areas or peak usage times.

When the quota reaches the threshold limit, the data center can issue an audit log notification to the administrator or the user, which can state "Usage on resource $(Resource) in quota $(Quota_Name) has reached the configured threshold $ {Threshold_User_Percentage}. Please contact your system administrator." An example administrator audit log can state "Usage on resource $(Resource) in quota $ (Quota_Name) has reached the configured threshold $ {Threshold_Admin_Percentage}." With this and other notifications, the data center can be configured to delay or postpone notifications so that a user does not get flooded with similar notifications. Alternately the data center can provide a digest of all notifications at a specific time interval, such as every 30 minutes or every 24 hours.

The data center can assign a configurable grace percentage to a quota, user, or group of users. A grace percentage can allow a user to have a chance to consume resources even if the quota has exceeded the limit. When use of a quota reaches its resources limit, the user will still be able to consume resources depending on the grace percentage. The data center can implement a default grace period, such as 20% of the quota resource limitations. When user starts to use resources under the grace percentage, the data center can trigger a notification event to the administrator and to any users associated with exceeding the grace limit. The data center can issue an audit log warning message to the user and the administrator, such as "Usage on resource $(Resource) in Quota $(Quota_Name) has reached its limit due to an action made by user $ {UserName}." The administrator can set an email event when Quota resources exceed their limit.

The data center can implement cluster level quotas independently of outside features, and can be implemented and managed within the scope of the data center engine core. When handling plug/unplug disks or attach/detach disks, the entity can still consume resources from its configured original Quota on which the entity was created.

Figure 13:
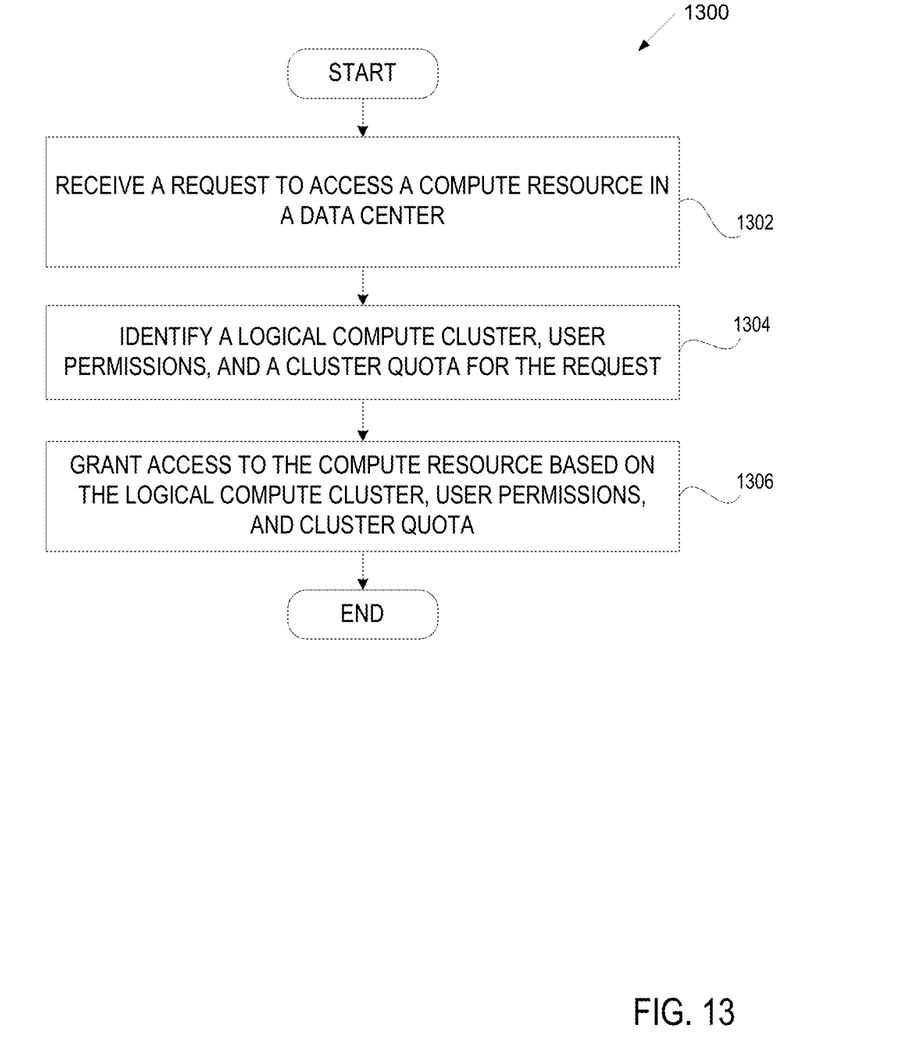
FIG. 13 illustrates a first example flow diagram of one embodiment of a method for providing access to a user to compute resources under a cluster level quota.

FIG. 13 illustrates a first example flow diagram of one embodiment 1300 of a method for providing access to a user to compute resources under a cluster level quota. The data center receives a request from a user to access a computing resource in a data center (1302). The computing resource can be memory, processor, storage, a maximum number of virtual machines, a maximum number of concurrently running virtual machines, network bandwidth, or other resource. The data center identifies a logical compute cluster associated with the computing resource, permissions associated with the user for accessing the logical compute cluster, and a cluster quota for the logical compute cluster (1304). The cluster quota can be associated with the user or with a user group of which the user is a member.

Upon determining that the cluster quota permits an expected use of the computing resource according to the request, the data center grants access to the computing resource to the user in response to the request (1306). The data center can further record the request and associated use of the computing resource in a log. The data center can optionally monitor usage of the computing resource. Upon determining that usage of the computing resource is within a threshold of a maximum usage indicated by the cluster quota, the data center can send an alert that usage of the computing resources is within the threshold. The alert can be sent to the user responsible for using the computing resource, or to an administrator or other user managing usage of resources under the cluster quota. Similarly, the data center can monitor usage of the computing resource, and determine that the usage of the computing resource exceeds a maximum usage indicated by the cluster quota. The data center can then send an alert that usage of the computing resource exceeds the maximum usage. The data center can further deny additional requests for the computing resource until the usage is below the maximum usage, or can determine that the usage of the computing resource is within a grace limit, and notify the user that the usage of the computing resource is within the grace limit.

In an alternative embodiment, the data center receives a request from a user for compute resources in a logical cluster within a data center, wherein the user is associated with the logical cluster, and wherein the logical cluster is associated with a cluster quota, and calculates an expected resource quantity to satisfy the request. Then the data center determines that the logical cluster has sufficient available compute resources to satisfy the request based on the expected resource quantity, and determines that the cluster quota allows usage of the expected resource quantity in the logical cluster. If these conditions are met, the data center grants access to the computing resource in the logical cluster to the user in response to the request.

Figure 14:
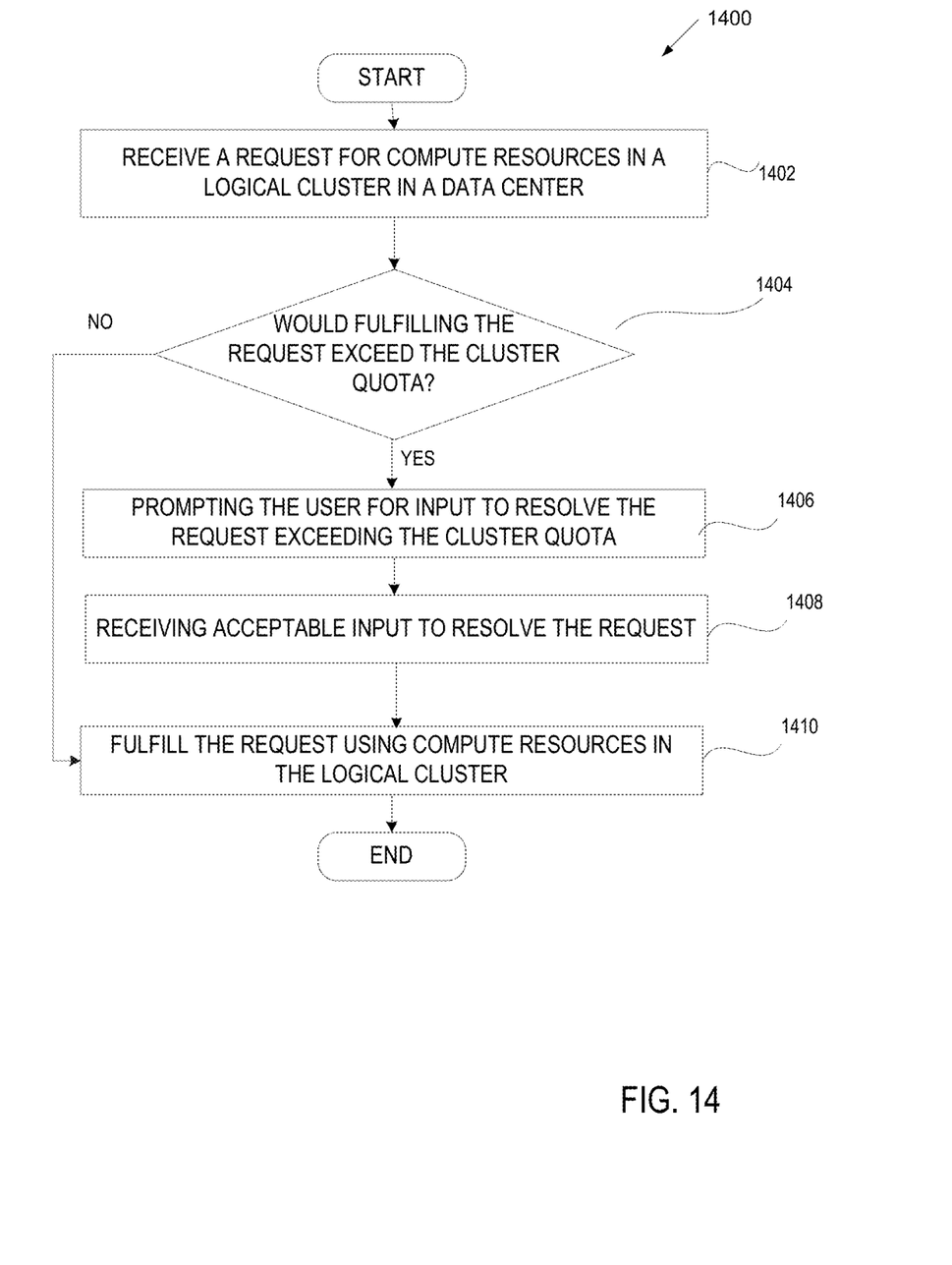
FIG. 14 illustrates a second example flow diagram of one embodiment of a method for handling requests for compute resources which would exceed a cluster level quota.

FIG. 14 illustrates a second example flow diagram of one embodiment 1400 of a method for handling requests for compute resources which would exceed a cluster level quota. The data center receives a request from a user to access a computing resource in a logical cluster in a data center, wherein the logical cluster is associated with a cluster level quota (1402). The request can be automatically generated by a program or software module at the instruction of the user. The data center identifies whether fulfilling the request would exceed the cluster level quota (1404). If fulfilling the request would not exceed the cluster quota, the data center simply fulfills the request (1410). If, on the other hand, fulfilling the request would exceed the cluster quota, the data center can prompt the user that fulfilling the request would exceed the cluster level quota (1406) and receive a response from the user (1408). The response from the user can include expanding the cluster level quota, reducing an amount of the computing resource requested, authorizing delayed fulfillment of the request until fulfilling the request would be within the cluster level quota, or some other action which would allow the request to be fulfilled. Then the data center can fulfill the request based on the response (1410). The data center can fulfill a first portion of the request and deny a second portion of the request, and can provide a notification to the user or to a requesting program regarding which portions of the request were fulfilled and which were denied.

Figure 15:
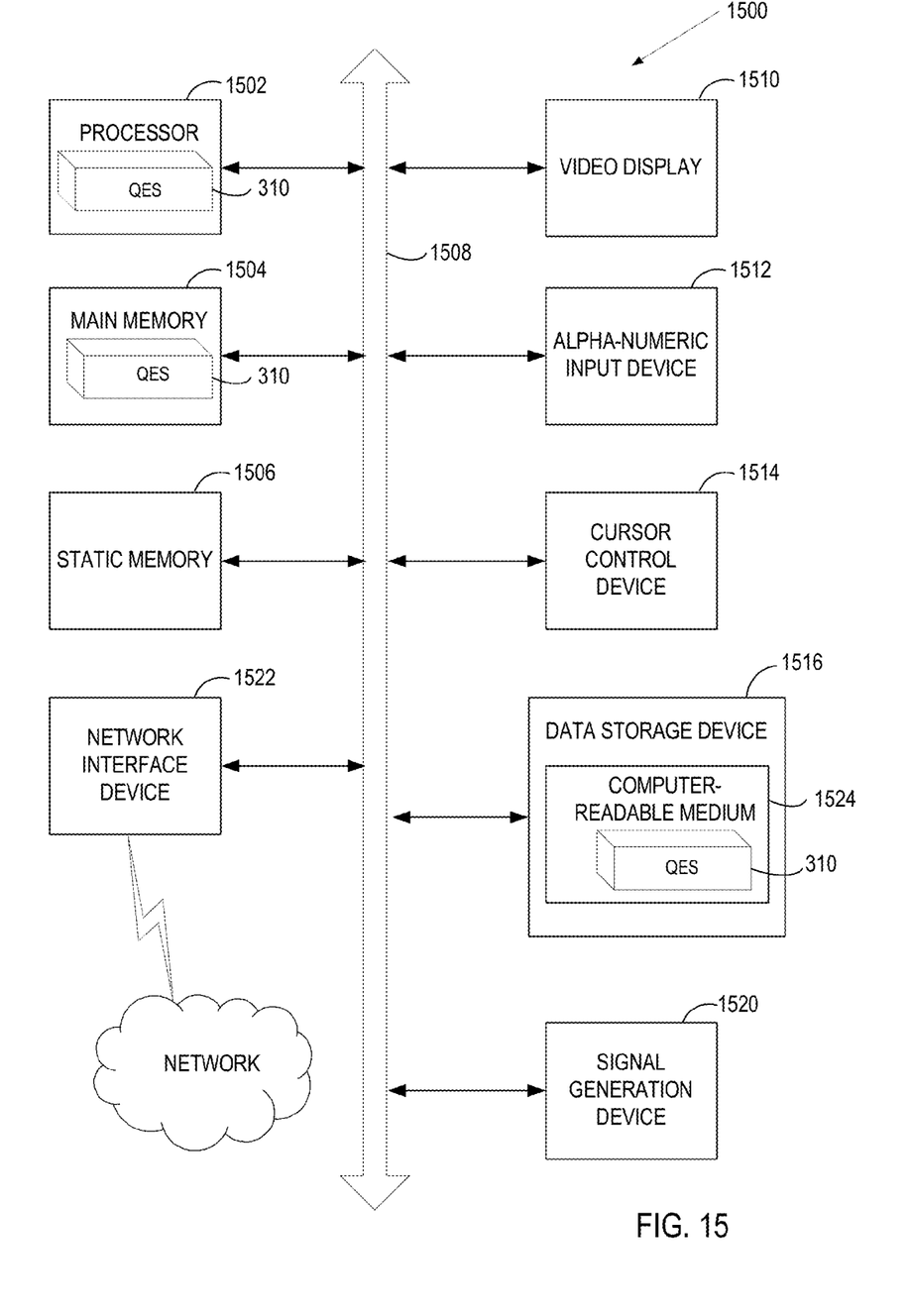
FIG. 15 illustrates a block diagram of an example computer system, in accordance with one embodiment of the present invention.

FIG. 15 illustrates a diagrammatic representation of a machine in the example form of a computer system 1500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computer system 1500 includes a processing device 1502, a main memory 1504 (e.g., read-only memory (ROM), flash memory, dynamic random access memory (DRAM) such as synchronous DRAM (SDRAM) or Rambus DRAM (RDRAM), etc.), a static memory 1506 (e.g., flash memory, static random access memory (SRAM), etc.), and a secondary memory 1518 (e.g., a data storage device), which communicate with each other via a bus 1508.

Processing device 1502 represents one or more general-purpose processing devices such as a microprocessor, central processing unit, or the like. More particularly, the processing device 1502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1502 may also be one or more special-purpose processing devices such as an application specific integrated circuit (ASIC), a field programmable gate array (FPGA), a digital signal processor (DSP), network processor, or the like. Processing device 1502 is configured to execute processing logic (e.g., instructions for an quota enforcement subsystem 310) for performing the operations and steps discussed herein.

The computer system 1500 may further include a network interface device 1522. The computer system 1500 also may include a video display unit 1510 (e.g., a liquid crystal display (LCD) or a cathode ray tube (CRT)), an alphanumeric input device 1512 (e.g., a keyboard), a cursor control device 1514 (e.g., a mouse), other user input device such as a touch screen or a microphone, and a signal generation device 1520 (e.g., a speaker).

The secondary memory 1518 may include a machine-readable storage medium (or more specifically a computer-readable storage medium) 1524 on which is stored one or more sets of instructions for the quota enforcement subsystem 310 embodying any one or more of the methodologies or functions described herein. The instructions 1526 may also reside, completely or at least partially, within the main memory 1504 or within the processing device 1502 during execution thereof by the computer system 1500, the main memory 1504 and the processing device 1502 also constituting machine-readable storage media.

The computer-readable storage medium 1524 may also be used to store a problem resolution manager which may correspond to the quota enforcement subsystem 310 of FIG. 1), or a software library containing methods that call a quota enforcement subsystem 310. While the computer-readable storage medium 1524 is shown in an example embodiment to be a single medium, the term "computer-readable storage medium" should be taken to include a single medium or multiple media (e.g., a centralized or distributed database, or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    receiving, by a processing device, a request to access a computing resource in a data center comprising a plurality of host machines hosting a plurality of virtual machines;
    identifying a logical compute cluster associated with the computing resource, permissions associated with accessing the logical compute cluster, and a plurality of different concurrently enforced cluster quotas for the logical compute cluster, wherein the logical compute cluster comprises at least one of a subset of the plurality of virtual machines or the plurality of host machines;
    identifying, in view of the request, a first set of the plurality of different concurrently enforced cluster quotas applicable to the request; and
    upon determining that the first set of the plurality of different concurrently enforced cluster quotas permits an expected use of the computing resource according to the request, granting, by the processing device, access to the computing resource to the user in response to the request.

2. The method of claim 1, wherein the computing resource comprises at least one of memory, processor, storage, virtual machine, or network bandwidth.

3. The method of claim 1, wherein the cluster quota is associated with a user group.

4. The method of claim 1, further comprising: recording the request and associated use of the computing resource in a log.

5. The method of claim 1, further comprising:
    monitoring usage of the computing resource;
    determining that usage of the computing resource is within a threshold of a maximum usage indicated by the first set of the plurality of different concurrently enforced cluster quotas; and
    sending an alert that usage of the computing resources is within the threshold.

6. The method of claim 1, further comprising:
    monitoring usage of the computing resource;
    determining that the usage of the computing resource exceeds a maximum usage indicated by the first set of the plurality of different concurrently enforced cluster quotas; and
    sending an alert that usage of the computing resource exceeds the maximum usage.

7. The method of claim 6, further comprising: denying an additional request for the computing resource until the usage is below the maximum usage.

8. The method of claim 6, further comprising:
    determining that the usage of the computing resource is within a grace limit; and
    sending a notification indicating that the usage of the computing resource is within the grace limit.

9. A system comprising:
    a memory to store a plurality of different concurrently enforced cluster quotas; and
    a processing device operatively coupled to the memory, the processing device to:
        receive a request for compute resources in a logical cluster within a data center, wherein the user is associated with the logical cluster, and wherein the logical cluster is associated with the plurality of different concurrently enforced cluster quotas;
        calculate an expected resource quantity to satisfy the request;
        determine that the logical cluster has sufficient available compute resources to satisfy the request in view of the expected resource quantity;
        identify, in view of the request, a first set of the plurality of different concurrently enforced cluster quotas applicable to the request;
        determine that the first set of the plurality of different concurrently enforced cluster quotas allows usage of the expected resource quantity in the logical cluster; and
        grant access to the computing resource in the logical cluster in response to the request.

10. The system of claim 9, wherein the first set of the plurality of different concurrently enforced cluster quotas is associated with a grace limit allowing resource usage beyond a maximum indicated by the identified at least one of the plurality of different concurrently enforced cluster quotas.

11. The system of claim 10, the processing device to:
    determine that the expected resource quantity exceeds the first set of the plurality of different concurrently enforced cluster quotas and is within the grace limit;
    generate a notification that the expected resource quantity exceeds the first set of the plurality of different cluster quotas; and
    grant access to the computing resource under the grace limit.

12. The system of claim 9, wherein the access is granted to a user that is different from an administrator who created the plurality of different concurrently enforced cluster quotas.

13. The system of claim 9, wherein the plurality of different cluster quotas indicate separate respective compute resource quotas for different compute resource types.

14. The system of claim 9, wherein the request is associated with an event that consumes the compute resources.

15. A non-transitory computer-readable storage medium comprising instructions which, when executed by a processing device, cause the processing device to:

receive, by the processing device, a request from to access a computing resource in a logical cluster in a data center, wherein the logical cluster is associated with a plurality of different concurrently enforced cluster quotas;

identify, in view of the request, a first set of the plurality of different concurrently enforced cluster quotas applicable to the request;

identify, by the processing device, that fulfilling the request would exceed the first set of the plurality of different cluster quotas;

send a notification indicating that fulfilling the request would exceed the first set of the plurality of different concurrently enforced cluster quotas;

receive a response to the notification; and fulfill the request in view of the response.

16. The non-transitory computer-readable storage medium of claim 15, wherein the response comprises an instruction to expand the first set of different concurrently enforced cluster quotas.

17. The non-transitory computer-readable storage medium of claim 15, wherein the response comprises an instruction to reduce an amount of the computing resource requested.

18. The non-transitory computer-readable storage medium of claim 15, wherein the response comprises an authorization to delay fulfillment of the request until fulfilling the request would be within the first set of the plurality of different concurrently enforced cluster quotas.

19. The non-transitory computer-readable storage medium of claim 15, wherein to fulfill the request, the processing device is further to fulfill a first portion of the request and denying a second portion of the request.

20. The non-transitory computer-readable storage medium of claim 15, wherein the request relates to an event for which computing resources are required.

\* \* \* \* \*